United States Patent
Yuguchi et al.

(10) Patent No.: US 6,417,654 B1
(45) Date of Patent: Jul. 9, 2002

(54) SWITCHING POWER SUPPLY

(75) Inventors: Osamu Yuguchi, Komatsu; Manabu Takemoto, Ishikawa-ken, both of (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/990,699

(22) Filed: Nov. 20, 2001

(30) Foreign Application Priority Data

Dec. 6, 2000 (JP) ........................................ 2000-371745

(51) Int. Cl.[7] ................................................ G05F 1/40
(52) U.S. Cl. ........................ 323/285; 323/225; 323/286; 363/47
(58) Field of Search ................................ 323/259, 222, 323/225, 282, 284, 285, 286; 363/45, 46, 47, 56.1; 361/18, 93.9

(56) References Cited

U.S. PATENT DOCUMENTS

| | | | | |
|---|---|---|---|---|
| 4,428,015 A | * | 1/1984 | Nesler | 323/285 X |
| 4,814,684 A | * | 3/1989 | McCurdy | 323/222 |
| 5,528,125 A | * | 6/1996 | Marshall et al. | 323/222 |

* cited by examiner

Primary Examiner—Jessica Han
(74) Attorney, Agent, or Firm—Keating & Bennett, LLP

(57) ABSTRACT

A switching power supply includes a switching element, a diode, a choke coil, a comparator-detector, and a drive circuit. A first resistor and a second resistor are connected in series between one end of the choke coil and the ground, and the connection point thereof is connected to one input end of the comparator-detector. A third resistor and a parallel circuit including a fourth resistor and a capacitor are connected in series between the other end of the choke coil and the ground, and the connection point thereof is connected to the other input end of the comparator-detector. In addition, the output end of the comparator-detector is connected to the input end of the drive circuit, and the output end of the drive circuit is connected to the control end of the switching element.

25 Claims, 2 Drawing Sheets

SWITCHING POWER SUPPLY

BACKGROUND OF THE INVENTION

1. Field of the Invention

The present invention relates to a switching power supply, and more particularly, the present invention relates to a switching power supply that detects voltage for protecting individual functional circuits from experiencing an overcurrent.

2. Description of the Related Art

In a series-connected voltage stabilizer, when the load of a constant-voltage power supply is short-circuited or overloaded, a switching transistor for control or other function can be damaged. Thus, an overcurrent protection function is provided in the switching power supply to supply the power to individual functional circuits.

FIG. 2 is a circuit diagram showing a conventional switching power supply. A switching power supply 50 has been disclosed in Japanese Unexamined Patent Application Publication No. 6-269159, and includes a switching element 51, a diode D51, choke coils L51 and L52, a comparator-detector 52, and a drive circuit 53.

The switching element 51 is switched on or switched off according to the differential voltage between the input voltage Vi and the output voltage Vo. The diode D51 is a flywheel diode constructed to dissipate the energy (the power) accumulated in the choke coil L51 when the switching element 51 is switched on if the switching element 51 is switched off. The choke coil L51 accumulates the pulse voltage applied when the switching element 51 is switched on as energy. The choke coil L52 reduces ripple noise and spike noise. The comparator-detector 52 is inserted between both ends of the choke coil L52, detects the current flowing in the choke coil L52, and controls the drive circuit 53 which sets the ON-OFF ratio of the switching element 51. The drive circuit 53 outputs the control signal at the pulse so that the output voltage applied to the load (not shown in the figure) is consistent with the input voltage, implements the ON-OFF control of the switching element 51, and detects overcurrent.

As described above, the current is detected by making use of a resistance component of the choke coil L52, and overcurrent protection is realized in a configuration in which the comparator-detector 52 is inserted between both ends of the choke coil L52.

However, since the conventional switching power-supply detects the current by making use of the resistance component of the choke coil in order to reduce ripple noise and spike noise and realizes overcurrent protection, problems occur in that two choke coils, i.e., one choke coil provided for accumulating the pulse voltage applied when the switching element is switched on as energy and another choke coil provided for detecting the current are necessary, the manufacturing cost is increased, and the size of the switching power supply is increased.

SUMMARY OF THE INVENTION

In order to overcome the problems described above, preferred embodiments of the present invention provide a switching power supply in which the manufacturing cost and the size thereof are greatly reduced while solving the problems described above.

According to a preferred embodiment of the present invention, a switching power supply includes a switching element, a choke coil and a comparator-detector, wherein first and second voltages are detected from both ends of the choke coil to which the pulse voltage from the switching element is applied, the first and second voltages are compared with each other by the comparator-detector, and the operation of the switching element is controlled according to the output of the comparator-detector to provide overcurrent protection, wherein the first voltage detected from one end of the choke coil is partially divided by first and second resistors and inputted to one input end of the comparator-detector and wherein the second voltage detected from the other end of the choke coil is integrated by third and fourth resistors and a capacitor and inputted to the other input end of the comparator-detector.

According to another preferred embodiment of the present invention, a switching power supply includes a choke coil, a switching element and a comparator-detector, wherein first and second voltages are detected from both ends of the choke coil to which the pulse voltage from the switching element is applied, the first and second voltages are compared with each other by the comparator-detector, and the operation of the switching element is controlled according to the output of the comparator-detector to implement overcurrent protection, wherein first and second resistors are connected in series between a terminal to detect the first voltage of the choke coil and the ground, the connection point of the first and second resistors is connected to one input end of the comparator-detector, wherein a third resistor and a parallel circuit including a fourth resistor and a capacitor are connected in series between a terminal to detect the second voltage of the choke coil and the ground, the connection point of the third resistor to the fourth resistor is connected to the other input end of the comparator-detector, and wherein the output end of the comparator-detector is connected to a drive circuit operating the switching element.

According to another preferred embodiment of the present invention, a switching power supply accumulates the pulse voltage applied when a switching transistor is switched on as energy and detects the current can be achieved by a single choke coil because the first and second voltages are detected from both ends of the choke coil, the first voltage is partially divided by the first and second resistors and inputted in one input end of the comparator-detector, and the second voltage is integrated by the third and fourth resistors and the capacitor, and inputted in the other input end of the comparator-detector.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will be specifically described with reference to the attached drawings.

Figure 1:
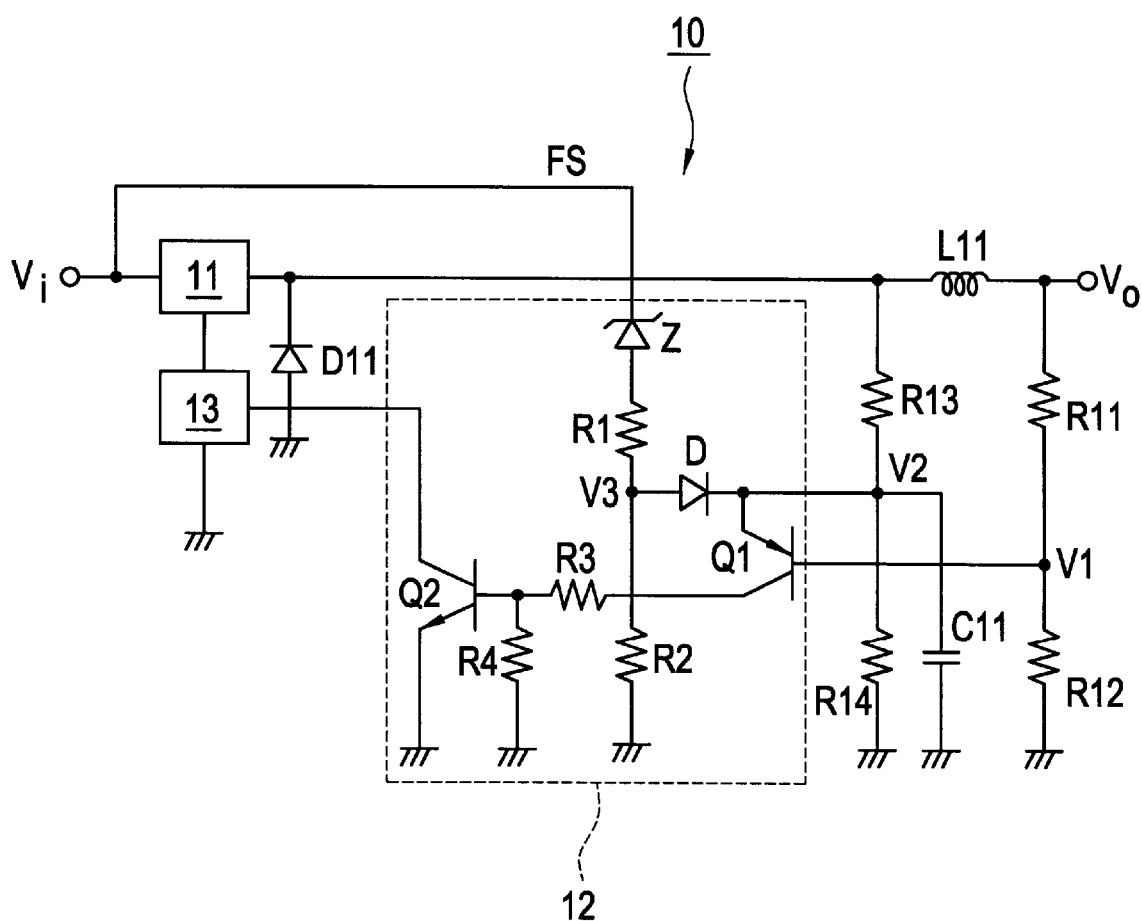
FIG. 1 is a circuit diagram of a switching power supply according to a preferred embodiment of the present invention.
Figure 2:
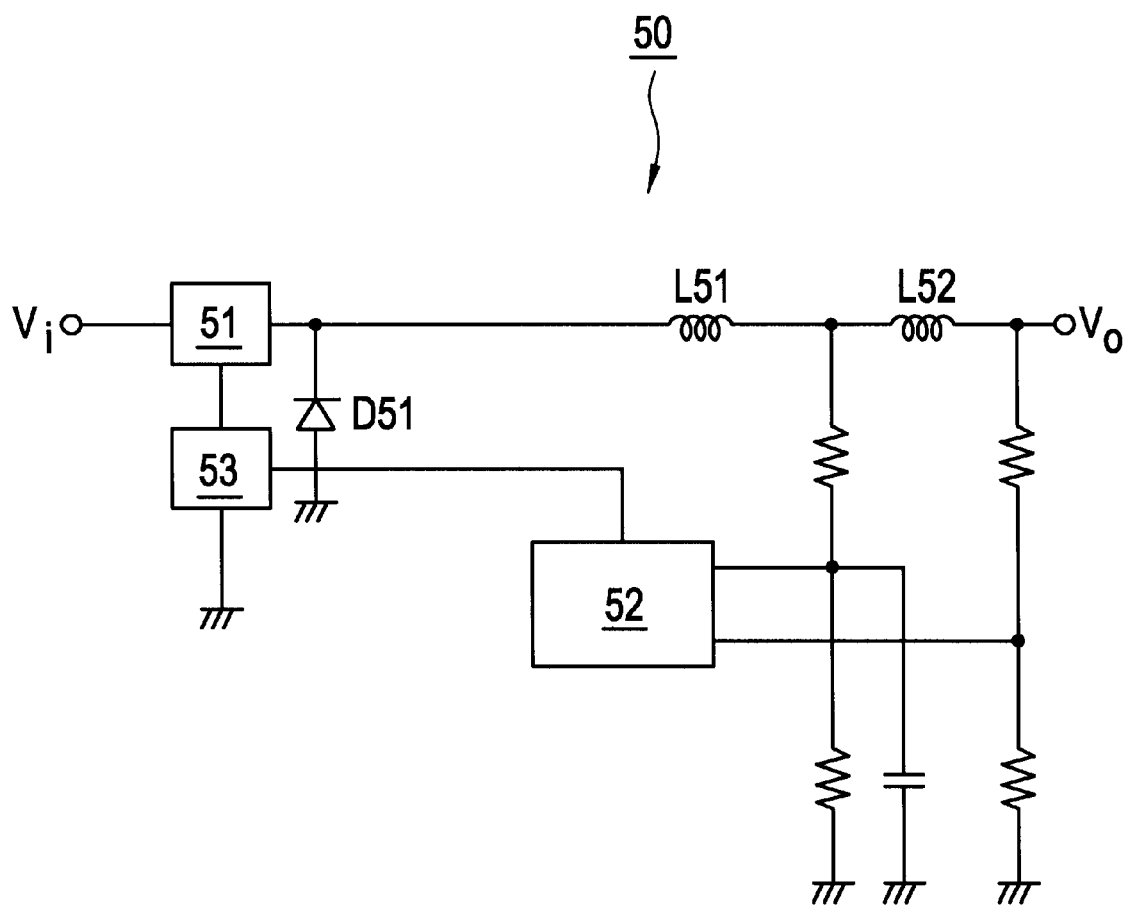
FIG. 2 is a circuit diagram of a conventional switching power supply.

FIG. 1 is a circuit diagram of a switching power supply according to a preferred embodiment of the present invention. A switching power supply 10 preferably includes a switching element 11, a diode D11, a choke coil L11, a comparator-detector 12, and a drive circuit 13.

The switching element 11 and the choke coil L11 are connected between the input Vi and the output Vo, a first resistor R11 and a second resistor R12 are connected in series to one end of the choke coil L11, i.e., between the output Vo side and the ground, and a connection point of the first and second resistors R11 and R12 is connected to one input end of the comparator-detector 12.

A third resistor R13 and a parallel circuit including a fourth resistor R14 and a capacitor C11 are connected in series between the other end of the choke coil L11, i.e., the input Vi side and the ground, and a connection point of the third and fourth resistors R13 and R14 is connected to the other input end of the comparator-detector 12.

In addition, the output end of the comparator-detector 12 is connected to the input end of the drive circuit 13, and the output end of the drive circuit 13 is connected to the control end of the switching element 11.

The switching element 11 is switched on or switched off according to the differential voltage between the input Vi and the output Vo. The diode D11 is preferably a flywheel diode constructed to dissipate the energy (the power) accumulated in the choke coil L11 when the switching element 11 is switched on if the switching element 11 is switched off.

The choke coil L11 accumulates the pulse voltage applied thereto as energy when the switching element 11 is switched on, and reduces ripple noise and spike noise. The comparator-detector 12 is inserted between both ends of the choke coil L11, detects the voltage across the choke coil L11, and controls the drive circuit 13 setting the ON-OFF ratio of the switching element 11.

The drive circuit 13 outputs the control signal at the pulse so that the output voltage to the load (not shown in the figure) is consistent with the input voltage, and implements the ON-OFF control of the switching element 11.

The comparator-detector 12 constitutes a latched circuit that preferably includes two transistors Q1 and Q2, one diode D, four resistors R1 to R4, and one Zener diode Z.

Next, the operation of the switching power supply 10 will be described.

The first voltage (the output voltage) is detected from one end of the choke coil L11, and the voltage V1 that is obtained by partially dividing the first voltage by the first and second resistors R11 and R12 is inputted to one input end of the comparator-detector 12.

The second voltage (the pulse voltage from the switching element 11) is detected from the other end of the choke coil L11, and the voltage V2 which is obtained by integrating the second voltage by the third and fourth resistors R13 and R14 and the capacitor C11 is inputted to the other input end of the comparator-detector 12. The voltage V2 inputted to the other input end of the comparator-detector 12 is integrated by the third and fourth resistors R13 and R14 and the capacitor C11, and becomes an average DC voltage of the second voltage detected from the other end of the choke coil L11.

The voltage V1 is compared with the voltage V2 by the comparator-detector 12. In a normal state in which the output current does not reach the overcurrent, V2 is below the overcurrent detecting voltage, and no signal is outputted from the output end of the comparator-detector 12.

On the other hand, in an abnormal state in which the output current is increased and reaches the overcurrent, the current V2 becomes greater than the overcurrent detection voltage, the signal is outputted from the output end of the comparator-detector 12, and the drive circuit 13 implements the ON-OFF control of the switching element 11 according to the signal. As a result, in an abnormal state in which the output current reaches the overcurrent, the output voltage and the output current are reduced to realize overcurrent protection.

Next, the case in which a latched circuit is used for the comparator-detector 12 will be specifically described below. In a normal state in which the output current does not reach the overcurrent, the relationship of the voltages is expressed by the inequality, $V2<V1+V_{BE}$ (where $V_{BE}$ is the base-emitter voltage of the transistor Q1), and the transistor Q1 is switched off. As a result, no signal is outputted from the output end of the comparator-detector 12.

On the other hand, in an abnormal state in which the output current reaches the overcurrent, the relationship of the voltages is expressed by the inequality/equation, $V2 \geq V1+V_{BE}$, and the transistor Q1 is switched on. As a result, the signal is outputted from the output end of the comparator-detector 12, and the drive circuit 13 implements the ON-OFF control of the switching element 11 according to the signal. As a result, in an abnormal state in which the output current reaches the overcurrent, the output voltage and the output current are reduced to achieve overcurrent protection.

Since the voltage V3 is obtained by the Zener diode Z and the resistors R1 and R2, the transistors Q1 and Q2 are maintained in an ON-state even when the voltages V1 and V2 drop, thus realizing a latching operation. Since the transistor Q2 is switched on, a feedback control signal FS is shut off, and the operation of the switching element 11 is stopped to prevent the overcurrent from flowing at the output Vo.

According to the switching power supply in accordance with various preferred embodiments of the present invention, the first and second voltages are detected from both ends of the choke coil to which the pulse voltage from the switching element is applied, the first voltage is partially divided by the first and second resistors and inputted to one input end of the comparator-detector, and the second voltage is integrated by the third and fourth resistors and the capacitor and is inputted to the other input end of the comparator-detector. As a result, accumulating the pulse voltage applied as energy when the switching transistor is switched on and detecting the current can be achieved by a single choke coil.

Thus, the manufacturing cost of the switching power supply is greatly reduced, and at the same time, the size thereof is also greatly reduced.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A switching power supply comprising:
   a switching element;
   a choke coil;
   a comparator-detector;
   first, second, third and fourth resistors; and
   a capacitor;
   wherein first and second voltages are detected from both ends of said choke coil to which the pulse voltage from said switching element is applied, said first and second voltages are compared with each other by said comparator-detector, and the operation of said switching element is controlled according to the output of said comparator-detector to implement overcurrent protection;

said first voltage detected from one end of said choke coil is partially divided by first and second resistors and inputted to one input end of said comparator-detector; and said second voltage detected from the other end of said choke coil is integrated by said third and fourth resistors and said capacitor and inputted to the other input end of said comparator-detector.

2. A switching power supply according to claim 1, further comprising a diode constructed to dissipate energy accumulated in the choke coil.

3. A switching power supply according to claim 2, wherein the diode is a flywheel diode.

4. A switching power supply according to claim 1, wherein the switching element and the choke coil are connected between an input and an output.

5. A switching power supply according to claim 1, wherein the first resistor and the second resistor are connected in series to an end of the choke coil, between the output side and the ground.

6. A switching power supply according to claim 1, wherein a connection point of the first and second resistors is connected to one input end of the comparator-detector.

7. A switching power supply according to claim 1, wherein the third resistor and a parallel circuit including the fourth resistor and the capacitor are connected in series between an end of the choke coil.

8. A switching power supply according to claim 1, wherein a connection point of the third and fourth resistors is connected to the other input end of the comparator-detector.

9. A switching power supply according to claim 1, wherein the output end of the comparator-detector is connected to the input end of the drive circuit.

10. A switching power supply according to claim 1, wherein the output end of the drive circuit is connected to the control end of the switching element.

11. A switching power supply according to claim 1, further comprising a drive circuit operating said switching element.

12. A switching power supply according to claim 1, wherein the comparator-detector is inserted between both ends of the choke coil, detects the voltage across the choke coil, and controls the drive circuit setting the ON-OFF ratio of the switching element.

13. A switching power supply according to claim 1, wherein the comparator-detector includes a latched circuit having two transistors, one diode, four resistors, and one Zener diode Z.

14. A switching power supply comprising:

a choke coil;

a switching element;

a drive circuit operating said switching element;

a comparator-detector;

first, second, third and fourth resistors; and a capacitor;

wherein first and second voltages are detected from both ends of said choke coil to which the pulse voltage from said switching element is applied, said first and second voltages are compared with each other by said comparator-detector, and the operation of said switching element is controlled according to the output of said comparator-detector to implement overcurrent protection;

said first and second resistors are connected in series between a terminal to detect the first voltage of said choke coil and the ground, the connection point of said first and second resistors is connected to one input end of said comparator-detector;

wherein said third resistor and a parallel circuit comprising said fourth resistor and said capacitor are connected in series between a terminal to detect the second voltage of said choke coil and the ground, the connection point of said third resistor to said fourth resistor is connected to the other input end of said comparator-detector; and wherein the output end of said comparator-detector is connected to said drive circuit operating said switching element.

15. A switching power supply according to claim 14, further comprising a diode constructed to dissipate energy accumulated in the choke coil.

16. A switching power supply according to claim 15, wherein the diode is a flywheel diode.

17. A switching power supply according to claim 14, wherein the first resistor and the second resistor are connected in series to an end of the choke coil, between the output side and the ground.

18. A switching power supply according to claim 14, wherein a connection point of the first and second resistors is connected to one input end of the comparator-detector.

19. A switching power supply according to claim 14, wherein the third resistor and a parallel circuit including the fourth resistor and the capacitor are connected in series between an end of the choke coil.

20. A switching power supply according to claim 14, wherein a connection point of the third and fourth resistors is connected to the other input end of the comparator-detector.

21. A switching power supply according to claim 14, wherein the output end of the comparator-detector is connected to the input end of the drive circuit.

22. A switching power supply according to claim 14, wherein the output end of the drive circuit is connected to the control end of the switching element.

23. A switching power supply according to claim 14, wherein the switching element and the choke coil are connected between an input and an output.

24. A switching power supply according to claim 14, wherein the comparator-detector is inserted between both ends of the choke coil, detects the voltage across the choke coil, and controls the drive circuit setting the ON-OFF ratio of the switching element.

25. A switching power supply according to claim 14, wherein the comparator-detector includes a latched circuit having two transistors, one diode, four resistors, and one Zener diode Z.

* * * * *